United States Patent
Yi et al.

(10) Patent No.: US 11,171,754 B2
(45) Date of Patent: Nov. 9, 2021

(54) METHOD AND APPARATUS FOR SHARING DEMODULATION REFERENCE SIGNAL FOR SHORT TTI IN WIRELESS COMMUNICATION SYSTEM

(71) Applicant: LG ELECTRONICS INC., Seoul (KR)

(72) Inventors: Yunjung Yi, Seoul (KR); Eunsun Kim, Seoul (KR); Hyangsun You, Seoul (KR)

(73) Assignee: LG Electronics Inc., Seoul (KR)

( * ) Notice: Subject to any disclaimer, the term of this patent is extended or adjusted under 35 U.S.C. 154(b) by 693 days.

(21) Appl. No.: 16/073,723

(22) PCT Filed: Feb. 13, 2017

(86) PCT No.: PCT/KR2017/001546
§ 371 (c)(1),
(2) Date: Jul. 27, 2018

(87) PCT Pub. No.: WO2017/138794
PCT Pub. Date: Aug. 17, 2017

(65) Prior Publication Data
US 2021/0218515 A1    Jul. 15, 2021

Related U.S. Application Data

(60) Provisional application No. 62/294,292, filed on Feb. 11, 2016.

(51) Int. Cl.
*H04W 72/12* (2009.01)
*H04L 5/00* (2006.01)
*H04W 72/04* (2009.01)

(52) U.S. Cl.
CPC ............ *H04L 5/005* (2013.01); *H04L 5/0037* (2013.01); *H04W 72/0446* (2013.01); *H04W 72/1284* (2013.01)

(58) Field of Classification Search
CPC ..... H04L 5/005; H04L 5/0037; H04L 5/0051; H04W 72/1284; H04W 72/0446; H04W 72/14; H04W 72/1294
See application file for complete search history.

(56) References Cited

U.S. PATENT DOCUMENTS

2017/0134236 A1*   5/2017 Patel ................... H04W 74/004

FOREIGN PATENT DOCUMENTS

| NO | 2015076712 | | 5/2015 | |
| WO | WO-2014157921 | A1 * | 10/2014 | ........... H04L 5/0051 |
| WO | WO-2017132841 | A1 * | 8/2017 | ........ H04W 72/1289 |

OTHER PUBLICATIONS

NPL title 3GPP TSG RAN WG1 Meeting #83, hereafter 3GPP. (Year: 2015).*

(Continued)

*Primary Examiner* — Thai Nguyen
(74) *Attorney, Agent, or Firm* — Lee, Hong, Degerman, Kang & Waimey

(57) ABSTRACT

Multiple short transmission time intervals (TTIs), each of which is shorter than 1 ms, may be configured in a subframe. A user equipment (UE) may transmit a demodulation reference signal (DM-RS) which is shared among different UEs to an eNodeB (eNB). In this case, the DM-RS may be transmitted in a reference TTI, which is one short TTI among the multiple short TTIs, and the reference TTI may be indicated by downlink control information (DCI) received from the eNB. Alternatively, a UE may transmit the DM-RS which is shared among different short TTIs to the eNB.

14 Claims, 13 Drawing Sheets

(56) References Cited

OTHER PUBLICATIONS

NPL titled 3GPP TSG-RAN WG2 #91bis (Tdoc R2-154740) (Year: 2015).*
PCT International Application No. PCT/KR2017/001546, International Search Report dated May 16, 2017, 3 pages.
Lenovo, "Consideration on TTI shortening for DL", R1-161017, 3GPP TSG RAN WG1 Meeting #84, Feb. 2016, 5 pages.
LG Electronics, "Discussion on PUSCH transmission with TTI shortening", R1-160655, 3GPP TSG RAN WG1 Meeting #84, Feb. 2016, 8 pages.
LG Electronics, "Discussion on DMRS based PDCCH transmission with TTI shortening", R1-160651, 3GPP TSG RAN WG1 Meeting #84, Feb. 2016, 11 pages.
Intel Corporation, "Aspects to consider for DL transmission of TTI shortening", R1-160436, 3GPP TSG-RAN WG1 #84, Feb. 2016, 7 pages.

* cited by examiner

METHOD AND APPARATUS FOR SHARING DEMODULATION REFERENCE SIGNAL FOR SHORT TTI IN WIRELESS COMMUNICATION SYSTEM

CROSS-REFERENCE TO RELATED APPLICATIONS

This application is the National Stage filing under 35 U.S.C. 371 of International Application No. PCT/KR2017/001546, filed on Feb. 13, 2017, which claims the benefit of U.S. Provisional Application No. 62/294,292, filed on Feb. 11, 2016, the contents of which are all hereby incorporated by reference herein in their entirety.

BACKGROUND OF THE INVENTION

Field of the Invention

The present invention relates to wireless communications, and more particularly, to a method and apparatus for sharing a demodulation reference signal (DM-RS) for a short transmission time interval (TTI) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In future of 3GPP LTE, it has been considered to reduce latency of data transmission. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation. Better latency than previous generations of 3GPP radio access technologies (RATs) was one performance metric that guided the design of LTE. LTE is also now recognized by the end-users to be a system that provides faster access to internet and lower data latencies than previous generations of mobile radio technologies. However, with regard to further improvements specifically targeting the delays in the system little has been done.

Packet data latency is important not only for the perceived responsiveness of the system, but it is also a parameter that indirectly influences the throughput. HyperText transfer protocol (HTTP)/transmission control protocol (TCP) is the dominating application and transport layer protocol suite used on the internet today. The typical size of HTTP-based transactions over the internet are in the range from a few 10's of Kbytes up to 1 Mbyte. In this size range, the TCP slow start period is a significant part of the total transport period of the packet stream. During TCP slow start, the performance is latency limited. Hence, improved latency can rather easily be shown to improve the average throughput, for this type of TCP-based data transactions. In addition, to achieve really high bit rates (in the range of Gbps with Rel-13 carrier aggregation), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound, hence higher block error rate (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. voice over LTE (VoLTE)), if keeping the same BLER target. This may improve the VoLTE voice system capacity.

There are more over a number of existing applications that would be positively impacted by reduced latency in terms of increased perceived quality of experience, e.g. gaming, real-time applications like VoLTE and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Various pre-scheduling strategies can be used to lower the latency to some extent, but similarly to shorter scheduling request (SR) interval introduced in Rel-9, they do not necessarily address all efficiency aspects. Accordingly, various techniques to reduce latency have been discussed. Specifically, as for one of techniques to reduce latency, a short transmission time interval (TTI) has been discussed.

SUMMARY OF THE INVENTION

The present invention relates to wireless communications, and more particularly, to a method and apparatus for sharing a demodulation reference signal (DM-RS) for a short transmission time interval (TTI) in a wireless communication system. The present invention discusses DM-RS transmission mechanisms for short TTI, particularly, when TTI size is very small (e.g. 1 or 2 symbols).

In an aspect, a method for transmitting a demodulation reference signal (DM-RS) by a first user equipment (UE) in a wireless communication system is provided. The method includes configuring multiple short transmission time intervals (TTIs), each of which is shorter than 1 ms, in a subframe, and transmitting the DM-RS which is shared among the first UE and a second UE to an eNodeB (eNB).

In another aspect, a method for transmitting a demodulation reference signal (DM-RS) by a user equipment (UE) in a wireless communication system is provided. The method includes configuring multiple short transmission time intervals (TTIs), each of which is shorter than 1 ms, in a subframe, and transmitting the DM-RS which is shared among a first short TTI and a second short TTI to an eNodeB (eNB).

DM-RS transmission overhead can be reduced.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
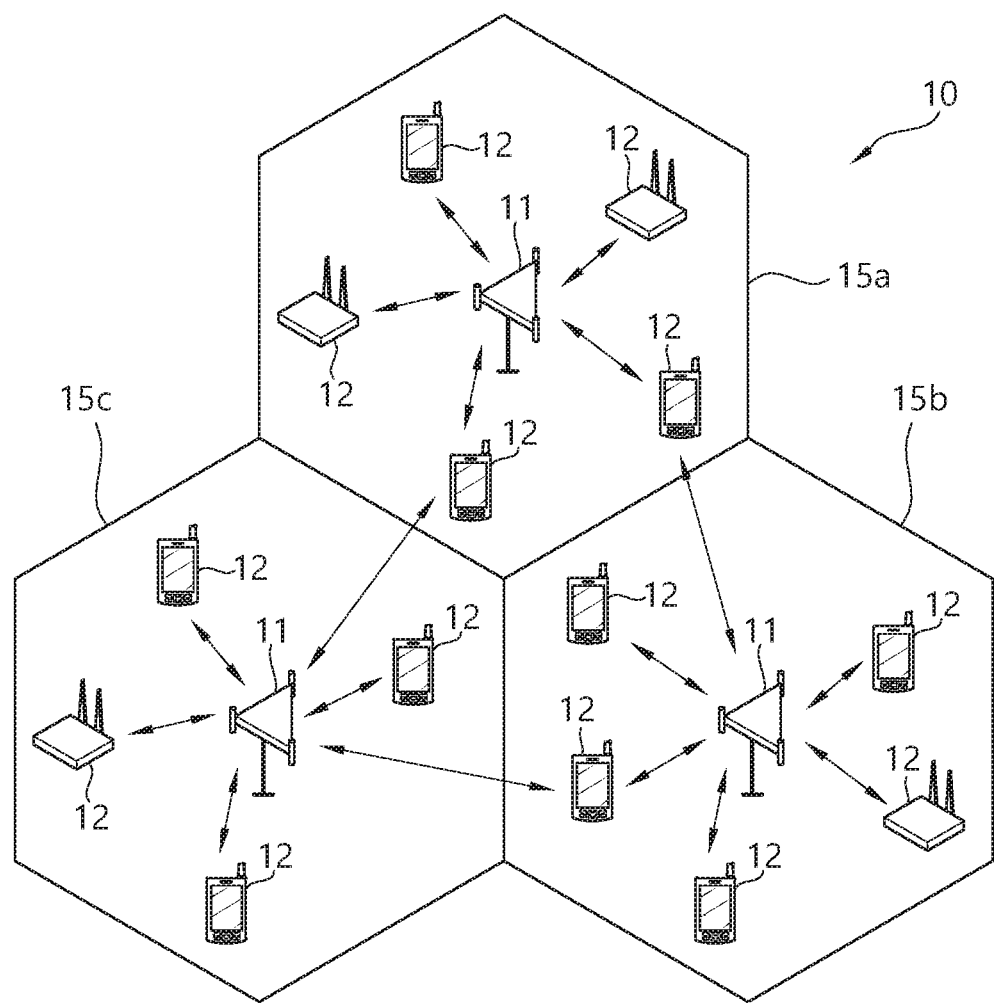
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
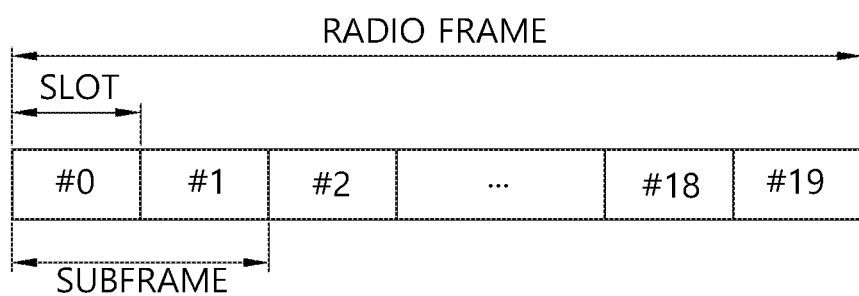
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

Figure 3:
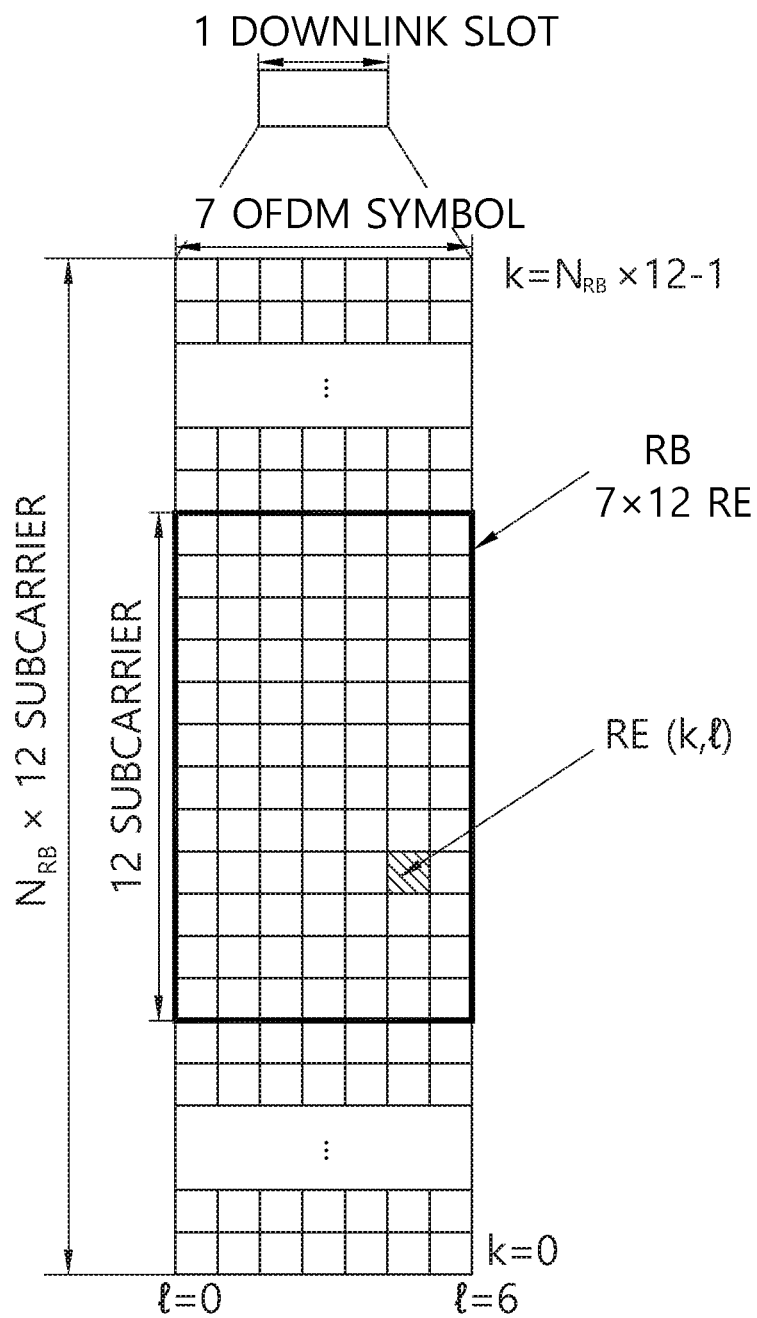
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, and 2048 may be selectively used as the number of subcarriers in one OFDM symbol.

Figure 4:
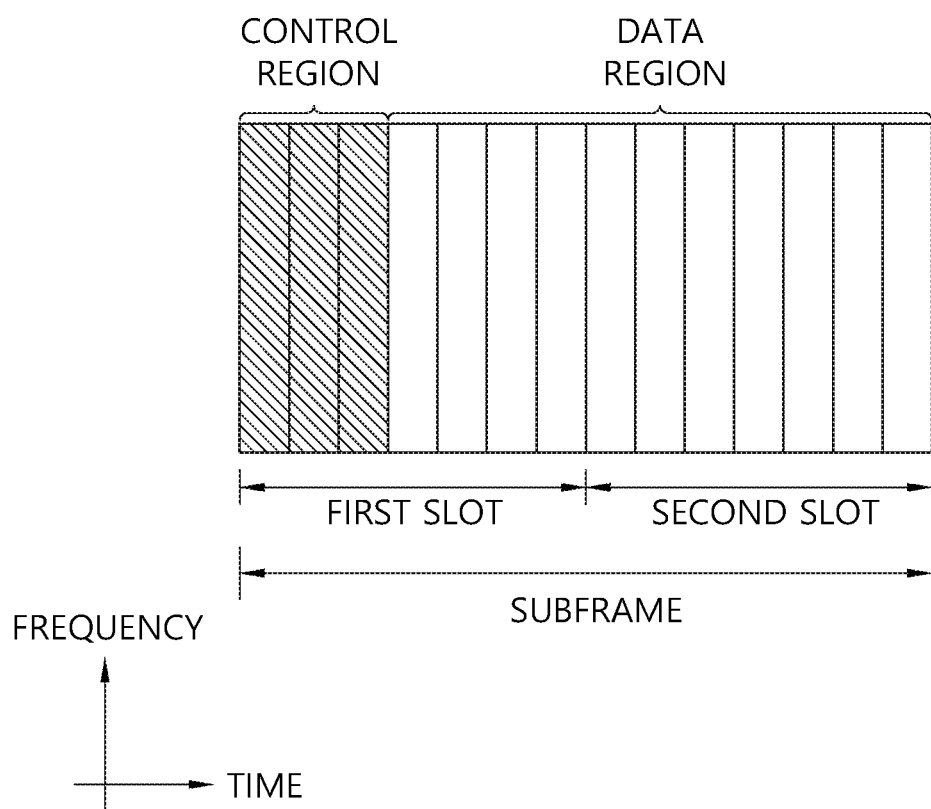
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PC-FICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

Figure 5:
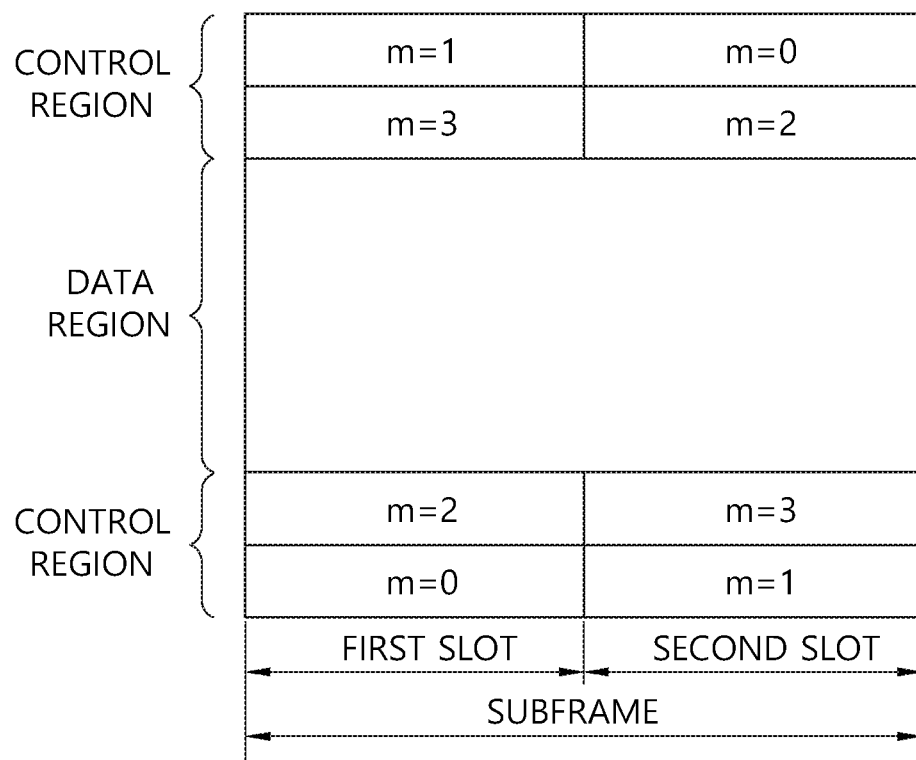
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Demodulation reference signal (DM-RS) (or, UE-specific reference signals associated with PDSCH) is transmitted on antenna port(s) p=5, p=7, p=8 or p=7, 8, . . . v+6, where v is the number of layers used for transmission of the PDSCH. The DM-RS is and is a valid reference for PDSCH demodulation only if the PDSCH transmission is associated with the corresponding antenna port. The DM-RS is transmitted only on the physical resource blocks upon which the corresponding PDSCH is mapped. The UE is expected to use the DM-RS to derive the channel estimate for demodulating the data in the corresponding PDSCH RBs. A typical usage of the DM-RS RS is to enable beamforming of the data transmissions to specific UEs.

In order to reduce latency, short TTI which may be shorter than current TTI (i.e. 1 ms) has been considered. For example, length of short TTI may be one of 1/2/3/4/7 symbols. When a short TTI is introduced for latency reduction in LTE, E-UTRAN may be configured with both normal TTI with 1 ms and short TTI with a value less than 1 ms, such as 2 symbols or 0.5 ms. With keeping the current LTE frame structure, OFDM symbol length, subcarrier spacing, etc., reduction of TTI generally means smaller transport block size (TBS) contained in one TTI, and relatively larger control overhead if DCI size is kept as the same. The short TTI may be achieved by increasing or changing subcarrier spacing.

When short TTI is adopted, and as a result, the number of OFDM symbols in reduced in one TTI (e.g. from 14 to 2) or subcarrier spacing increases (e.g. from 15 kHz to 60 kHz), a RB size may be different from the current RB size. For example, with subcarrier spacing of 60 kHz, one RB may include 12×8 resource elements, instead of 12×14 resource elements. For another example, when TTI length is 2 OFDM symbol length, one RB may include 12×2 resource elements. If short TTI is used, particularly with smaller number of OFDM symbols, larger RB size in frequency domain may be considered (e.g. one RB includes 48×2 resource elements). To be aligned in terms of total RE per PRB or resource unit, two 6 PRBs may be considered as a resource unit for 2 OFDM symbols short TTI case.

Figure 6:
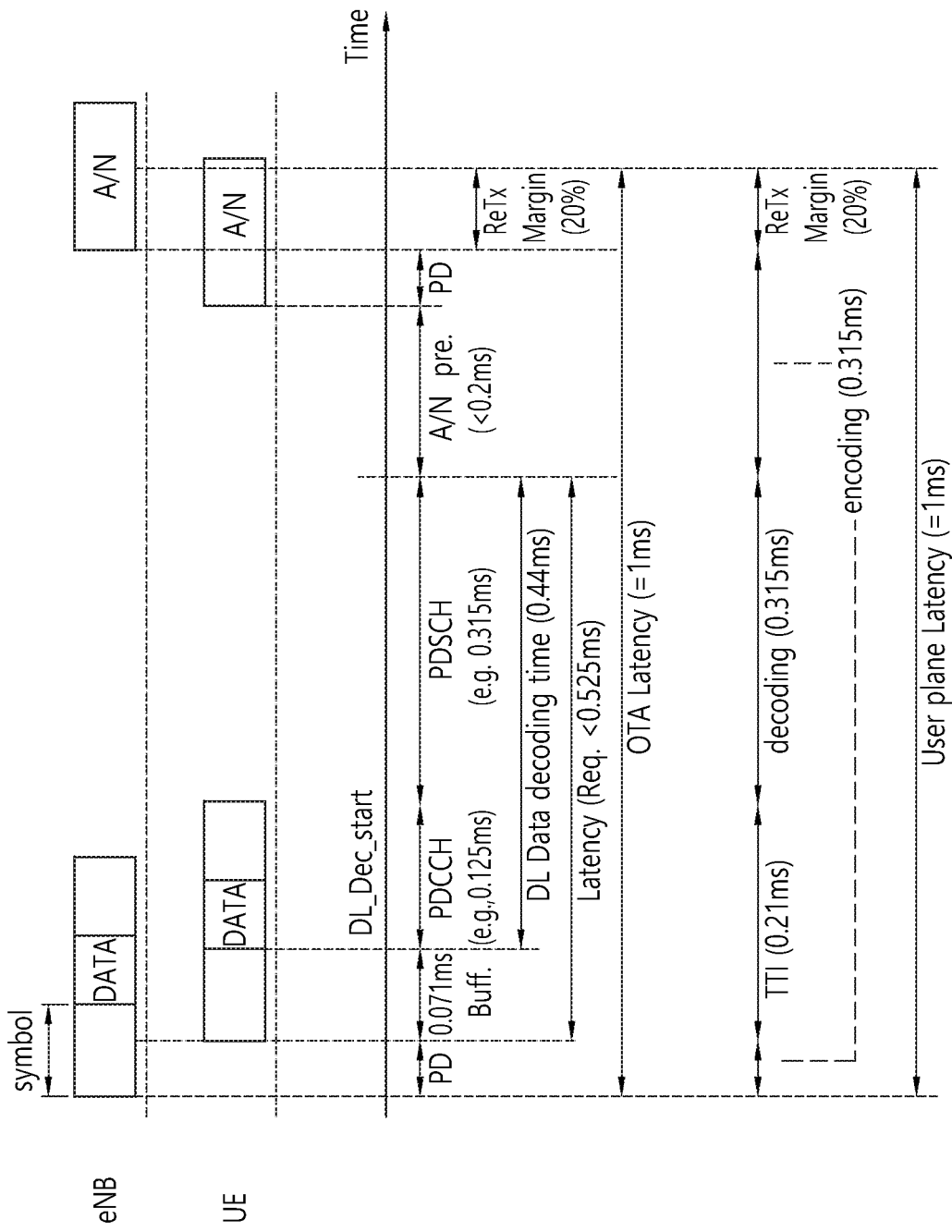
FIG. 6 shows an example of short TTI.

FIG. 6 shows an example of short TTI. FIG. 6 shows exchange of data and ACK/ANCK signal between eNB and UE. Referring to FIG. 6, user plane (U-plane) latency is calculated as timing between transmission of data (PDCCH/PDSCH) by the eNB and transmission of ACK/NACK signal by the UE. In order to reduce the U-plane latency to 1 ms, the TTI should be 0.21 ms, which is a length of about 3 OFDM symbols.

Figure 7:
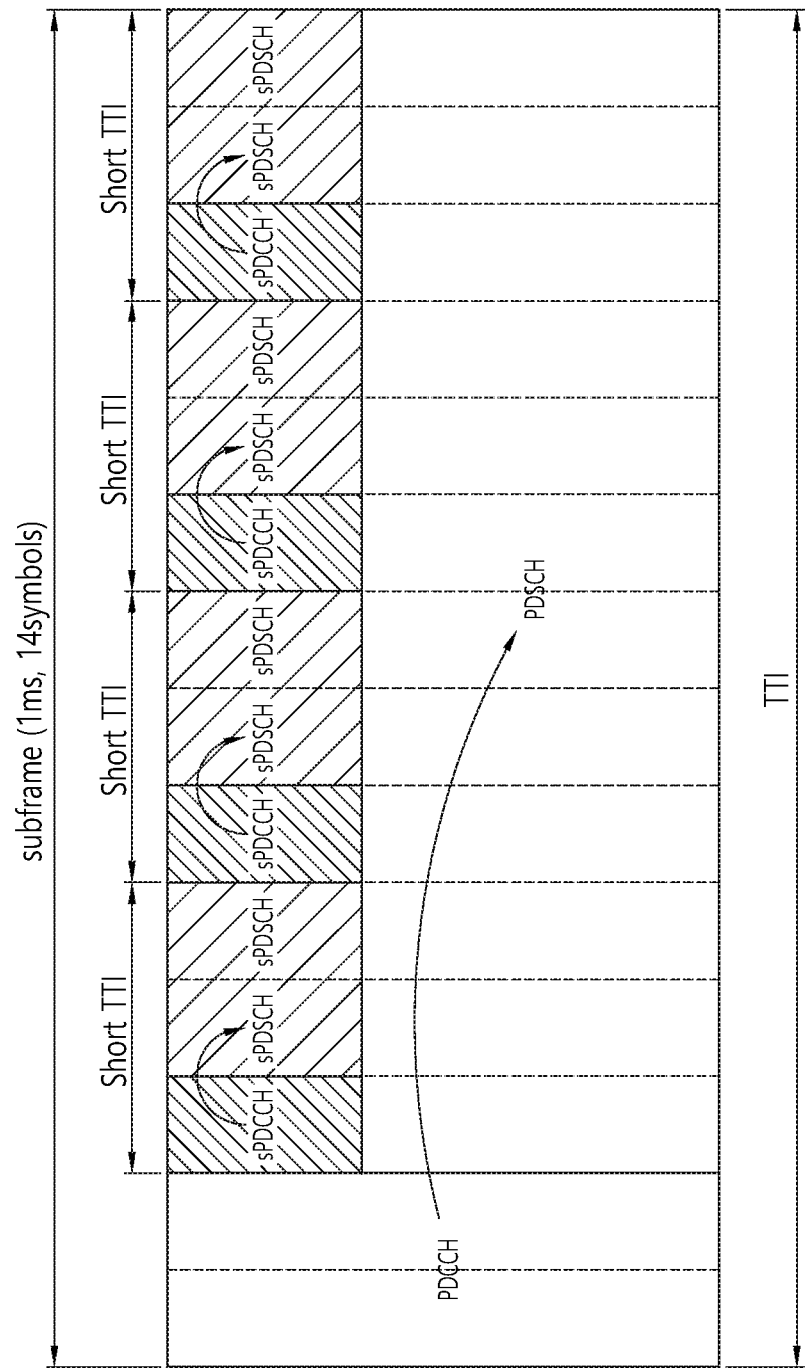
FIG. 7 shows another example of short TTI.

FIG. 7 shows another example of short TTI. Referring to FIG. 7, multiple short TTIs, which may include at least one OFDM symbol, may be configured in a subframe. In this example, it is assumed that one short TTI consists of 3 OFDM symbols, and accordingly, 4 short TTIs are configured in the subframe. OFDM symbols used for legacy control channel (i.e. PDCCH) transmission may not be configured for short TTI. In each short TTI, short TTI PDCCH (sPDCCH) for data scheduling and short TTI PDSCH (sPDSCH) for data transmission may be transmitted. In each short TTI, sPDCCH and sPDSCH may be transmitted by using different OFDM symbol each other, i.e. time division multiplexing (TDM) manner. In this example, the first OFDM symbol in each short TTI is used for sPDCCH which schedules sPDSCH, and second and third OFDM symbols in each short TTI are used for sPDSCH. Alternatively, sPDCCH and sPDSCH may be transmitted by using different frequency resources (e.g. different PRBs) from each other, i.e. frequency division multiplexing (FDM) manner.

As described above, in order to allow very low latency and fast data transmission, particularly for data transmission which requires fast feedback between sender(s) and receiver(s), a short TTI may be adopted. Meanwhile, considering virtual cell and/or massive number of antennas, it is also important to consider DM-RS or UE-specific RS or group-specific RS based control and data transmission. However, when the short TTI is adopted, the overhead of DM-RS or UE-specific or group-specific RS may increase, which may degrade the overall data reception performance.

To overcome the problem described above, sharing of DM-RS among different UEs and/or different short TTIs may be considered. Hereinafter, a method for sharing DM-RSs for short TTI among different UEs and/or different short TTIs may be proposed according to the present invention.

1. According to an embodiment of the present invention, the DM-RS may be shared among different UEs.

As one approach for sharing DM-RS among different UEs, a reference TTI may be indicated. The reference TTI may indicate a short TTI in which DM-RS is transmitted which may be used for data demodulation. The reference TTI may be transmitted earlier or later than the short TTI in which the data/control is transmitted. Or, the reference TTI may be the same short TTI in which the data/control is transmitted. For utilizing PRBs for DM-RS transmission, either only the same PRB where data/control is allocated may be used for DM-RS transmission or entire PRBs may be used for DM-RS transmission. Alternatively, a set of PRBs used for DM-RS transmission may be configured by higher layer via SIB or UE-specific or group-specific signaling.

The reference TTI may be indicated only within a set of short TTIs. For example, the reference TTI may be indicated only within legacy subframe boundary. The UE is supposed to buffer all data within legacy subframe boundary. For another example, the reference TTI may be indicated within a set of short TTIs where the size of the set may be configured by SIB and/or higher layer signaling or fixed per set of short TTIs. If the size of the set is fixed per set of short TTIs, and if a UE is scheduled with PDSCH in a short TTI within the set of short TTIs, the UE may always read DM-RS from the fixed short TTI within the set of short TTIs. For the reference TTI, at least one of the length/size of the reference TTI, starting/ending OFDM symbol of the reference TTI, the number of the reference TTI(s), the number of antenna ports used from DM-RS transmission, DM-RS density, etc., may be configured by the network. The reference TTI may be indicated via DCI. For example, whether DM-RS is going to be transmitted in current short TTI or next short TTI or previous short TTI may be indicated via DCI. Or, whether DM-RS is present or not in the current short TTI may be indicated simply by on-off indication.

Figure 8:
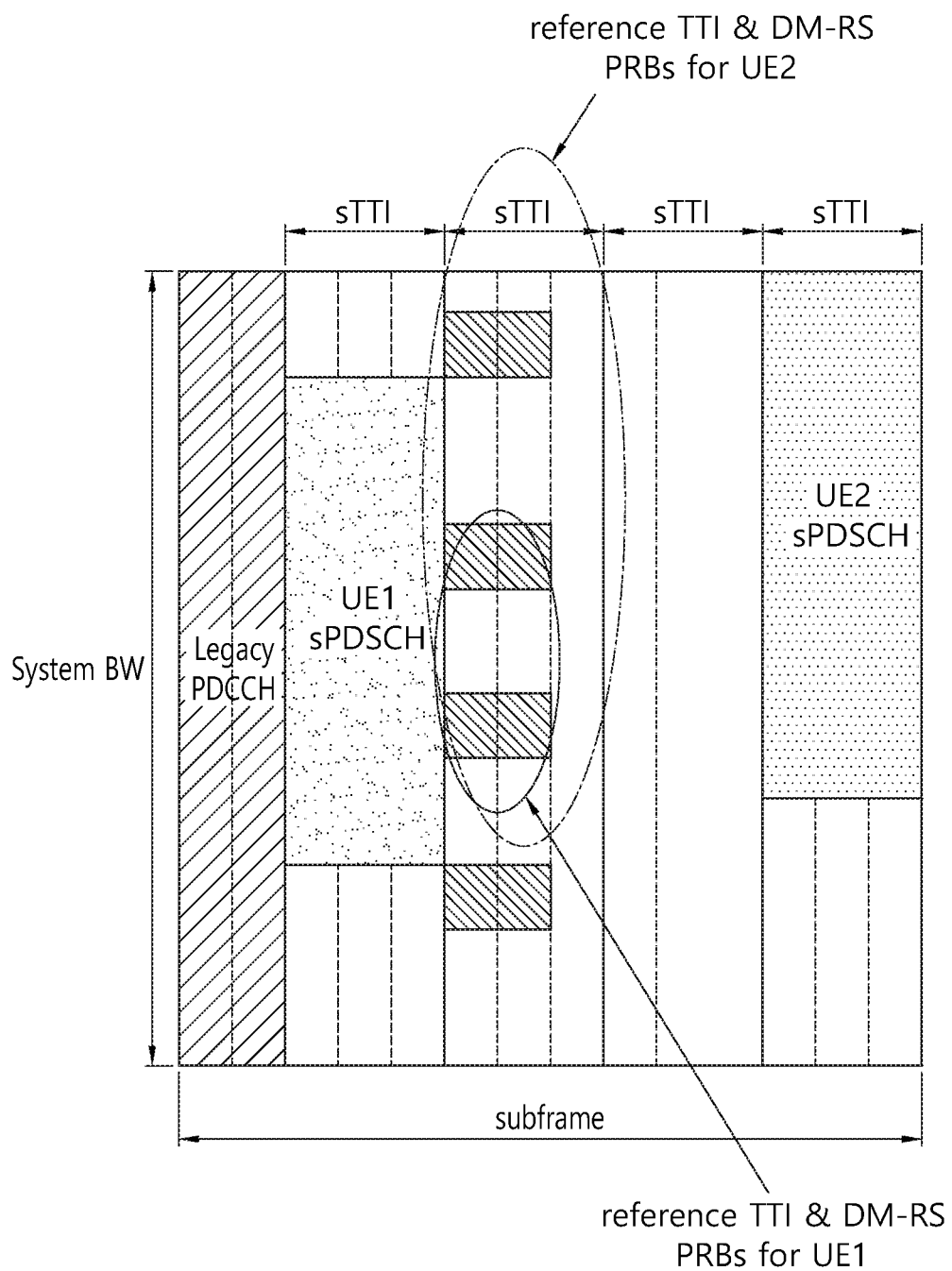
FIG. 8 shows an example of sharing DM-RS among different UEs according to an embodiment of the present invention.

FIG. 8 shows an example of sharing DM-RS among different UEs according to an embodiment of the present invention. Referring to FIG. 8, four short TTIs are configured in one subframe, and each short TTI consists of three OFDM symbols. In the first short TTI, sPDSCH of UE1 is allocated, and in the fourth short TTI, sPDSCH of UE2 is allocated. DM-RS which is to be shared by UE1 and UE2 is allocated in the second short TTI. That is, the second short TTI may be the reference TTI for DM-RS transmission. Accordingly, UE1 and UE2 can share DM-RS transmission in the reference TTI, i.e. the second short TTI.

For DM-RS sharing, the same DM-RS sequence may be used among UEs sharing the DM-RS. In this case, UEs sharing the same beam direction may be grouped for same DM-RS transmission. To allow finer beam direction per each UE, the shared DM-RS may be transmitted in the reference TTI and additional DM-RS may be further transmitted in each short TTI. A UE may perform channel estimation based on shared DM-RS and additional DM-RS.

Alternatively for DM-RS sharing, different DM-RS sequences may be used among UEs sharing the DM-RS. The different DM-RS sequences may be differentiated via code, i.e. code division multiplexing (CDM). If CDM is used for DM-RS transmission, data may be transmitted with multi-user MIMO (MU-MIMO) or may be transmitted in different short TTIs. To allow efficient CDM among multiple UEs, DM-RS may be transmitted in all subcarriers continuously over one or two OFDM symbols. CDM may be applied per each PRB, as the multiplexed UEs may be different in terms of scheduled PRBs. This approach may work only if the network has many antenna ports which can be distributed over multiple UEs. As the data may also be shared among multiple UEs with different codes in this case, this approach may be generally applied even without considering the reference TTI described above.

When determining how to extract DM-RS from the reference TTI, the number of antenna ports may be dynamically indicated for data scheduling such that the UE knows how many antenna ports to perform channel estimation based on DM-RS transmission in the reference TTI. When the UE determines the number of antenna ports, it may also dynamically indicated with the antenna ports as well. For example, if antenna ports 200 to 263 is used for transmitter's antenna, and the UE is configured with 4 antenna ports, which antenna ports are used may be indicated via higher layer signaling and/or dynamic signaling via DCI. Alternatively, the same antenna ports may be used for the reference TTI within the set of short TTIs which share the DM-RS transmission. For the common antenna ports, it may be higher layer configured or dynamically indicated by a common DCI which can be transmitted once per set of short TTIs.

As another approach for sharing DM-RS among different UEs, data transmission may be scheduled to multiple UEs at the same time. That is, group scheduling may be performed. In this case, DM-RS may be shared among multiple UEs, and the data may be differentiated among different UEs using different orthogonal cover codes (OCCs). If this approach is used, DM-RS transmission may occur within short TTI where data is scheduled. For group scheduling, either group-scheduling DCI or individual DCI may be used. In this case, DM-RS may be group-specific and data transmission may be UE-specific.

Figure 9:
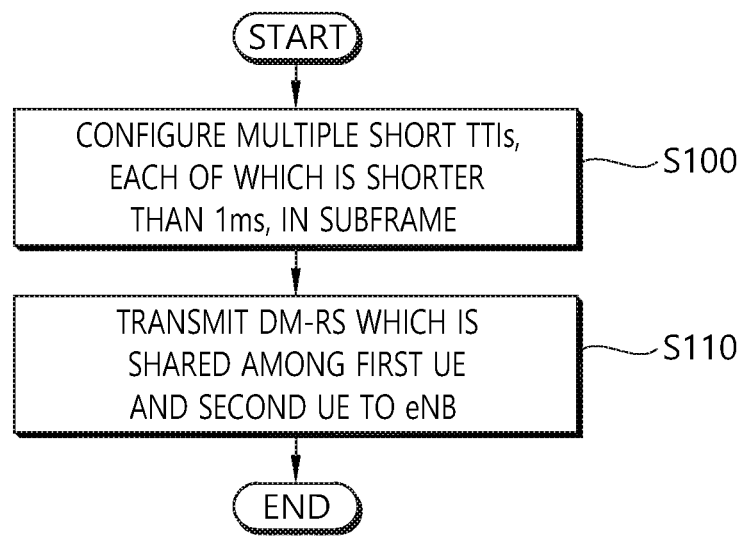
FIG. 9 shows a method for transmitting DM-RS according to an embodiment of the present invention.

FIG. 9 shows a method for transmitting DM-RS according to an embodiment of the present invention. The present invention described above, i.e. sharing the DM-RS among different UEs, may be applied to this embodiment.

In step S100, the first UE configures multiple short TTIs, each of which is shorter than 1 ms, in a subframe. In step S110, the first UE transmits the DM-RS which is shared among the first UE and a second UE to an eNB.

The DM-RS may be transmitted in a reference TTI, which is one short TTI among the multiple short TTIs. The reference TTI may be indicated by DCI received from the eNB. The reference TTI may be located earlier or later than a short TTI in which data or control signaling is transmitted. Or, the reference TTI is the same short TTI in which data control signaling is transmitted. The DM-RS may be transmitted by using a PRB in which data is transmitted in the reference TTI or entire PRBs in the reference TTI. Or, the DM-RS may be transmitted by using a set of PRBs in the reference TTI. The set of PRBs in the reference TTI may be configured by the eNB via higher layer signaling.

The DM-RS shared by the first UE and the second UE may use the same DM-RS sequence for the first UE and the second UE. Or, the DM-RS shared by the first UE and the second UE may use different DM-RS sequences for the first UE and the second UE, respectively. The different DM-RS sequences may be differentiated by a code.

2. According to another embodiment of the present invention, the DM-RS may be shared among short TTIs.

As one approach for sharing DM-RS among different short TTIs, DM-RS position or OFDM symbol(s) carrying DM-RS may be shared between multiple short TTIs. If the same DM-RS is transmitted, it may be up to the network to schedule UEs sharing the same beam direction in the adjacent short TTIs. Similar to DM-RS sharing among multiple UEs, CDM among DM-RS and/or data may also be used.

Figure 10:
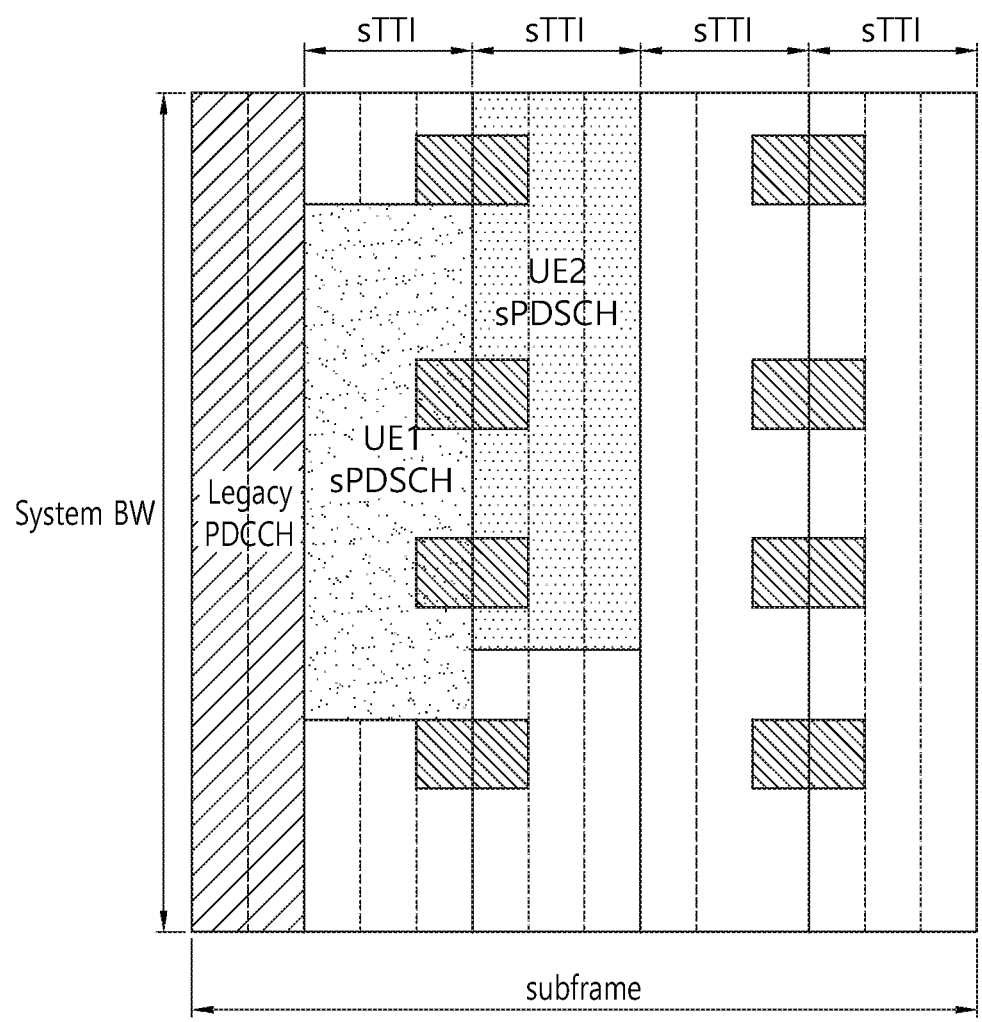
FIG. 10 shows an example of sharing DM-RS among different short TTIs according to an embodiment of the present invention.

FIG. 10 shows an example of sharing DM-RS among different short TTIs according to an embodiment of the present invention. Referring to FIG. 10, four short TTIs are configured in one subframe, and each short TTI consists of three OFDM symbols. In the first short TTI, sPDSCH of UE1 is allocated, and in the second short TTI, sPDSCH of UE2 is allocated. DM-RS, which is allocated across the first short TTI and the second short TTI, is shared by UE1 and UE2. That is, the DM-RS is shared among different short TTIs.

As another approach for sharing DM-RS among different short TTIs, a number of short TTIs used for a single UE may be indicated by higher layer signaling or dynamic signaling, with assumption that the same PRBs are used for data/control scheduling. For dynamic indication mechanism, the number in a common DCI which is transmitted once per set of short TTIs (e.g. in legacy PDCCH region) may be indicated. Based on the number of short TTIs for a specific UE, a UE may assume that DM-RS will be transmitted only in the first short TTI and the transmitted DM-RS may be used for other short TTIs without additional overhead of DM-RS transmission.

Figure 11:
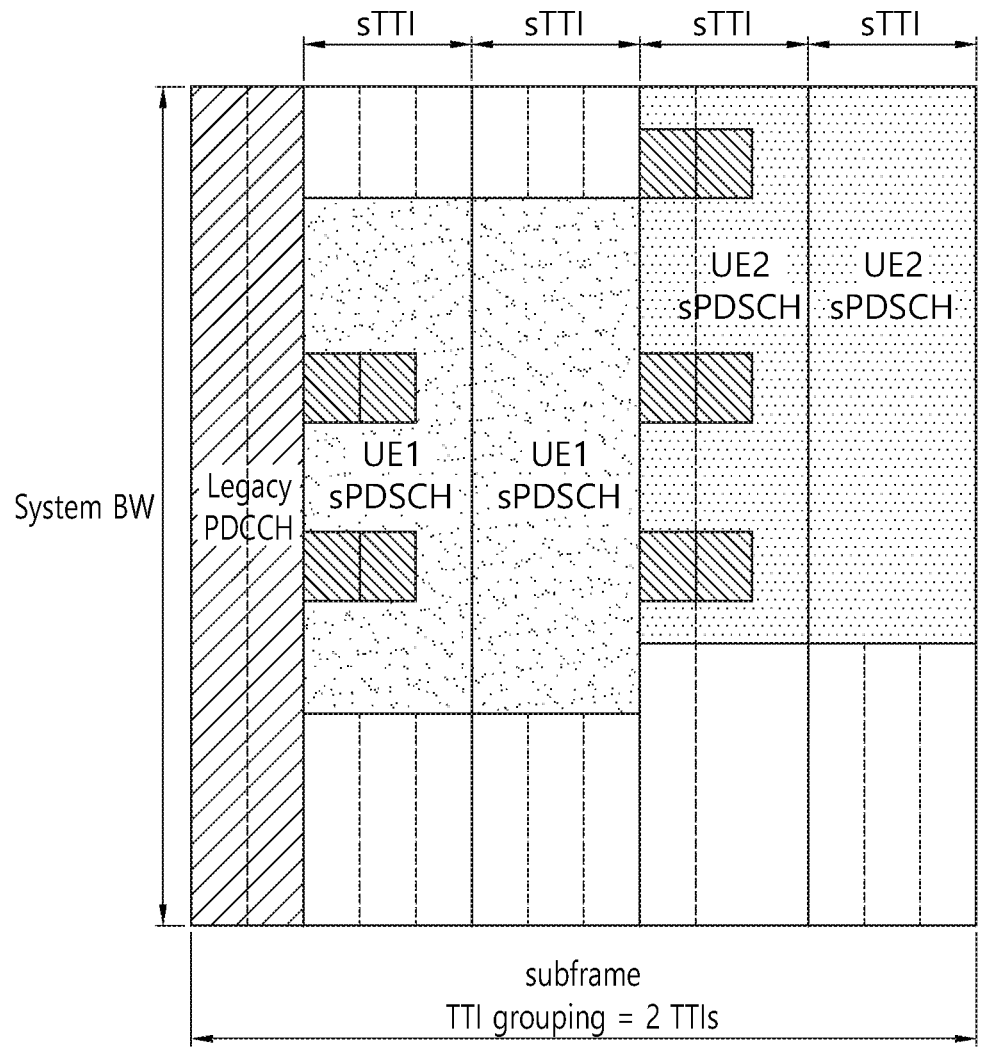
FIG. 11 shows another example of sharing DM-RS among different short TTIs according to an embodiment of the present invention.

FIG. 11 shows another example of sharing DM-RS among different short TTIs according to an embodiment of the present invention. Referring to FIG. 11, a UE is configured with 2 short TTIs for the unit of same UE scheduling. That is, sPDSCH of UE1 is allocated the first and second short TTIs, and sPDSCH of UE2 is allocated the third and fourth short TTIs. That is, the scheduling unit is 2 short TTIs. If a length of the scheduling unit is greater than 1, the starting short TTI of the scheduling unit may be determined by the first scheduling. In other words, among multiple short TTIs within the set of short TTIs (e.g. short TTIs within 1 ms), the starting TTI of the scheduling unit may be any short TTI. Once starting TTI of the scheduling unit is determined, the next few short TTIs may be scheduled to the same UE according to the configured scheduling unit. The similar effect may be achieved by scheduling one PDSCH over multiple short TTIs. However, this may require handling of larger transport block size (TBS) than TBS supported by one short TTI. Further, if multiple short TTIs are scheduled for data transmission, DM-RS transmission may be performed in the first short TTI in the scheduling unit. Referring to FIG. 11, DM-RS is transmitted in the first short TTI for UE1 and the third short TTI for UE2, i.e. the first short TTI in each scheduling unit.

When the scheduling unit consists of multiple shot TTIs, one TB may be scheduled over multiple short TTIs. In this case, a UE may need to decode a large TB across multiple short TTIs. Alternatively, different TBs may be scheduled over multiple TTIs, and separate TB may be scheduled over each TTI. Alternatively, one TB may be scheduled over one TTI and repeated over multiple TTIs. In this case, as the DM-RS density is different per each TTI, different rate matching may be used and/or different redundant version (RV) may be used in each TTI. The concept may be similar to TTI bundling, though the difference is to transmit DM-RS only in the first or one or a few short TTIs instead of transmitting in each short TTI.

Alternatively, the starting subframe and end subframe where DM-RS can be shared from a UE perspective may be configured by higher layer or indicated dynamically. In this case, the short TTI(s) position where DM-RS will be transmitted may also be signaled or indicated.

If the scheduling unit is configured/indicated, the same PRBs may be used for resource allocation. However, even within the scheduling unit, a UE may not be scheduled with data in a subset of scheduling unit. Thus, a UE may read sPDCCH in every TTI, regardless of scheduling unit configuration. If scheduling occurs, the UE may assume that DM-RS may not be present in the TTI based on scheduling unit configuration. If the scheduling unit consists of multiple short TTIs, this may not be applied. In other words, if the scheduling unit consists of multiple short TTIs, the UE may assume that all TTIs configured with the scheduling unit consisting of multiple short TTIs contains data transmission. Thus, in this case, a UE may not need to monitor sPDCCH in each short TTI.

Figure 12:
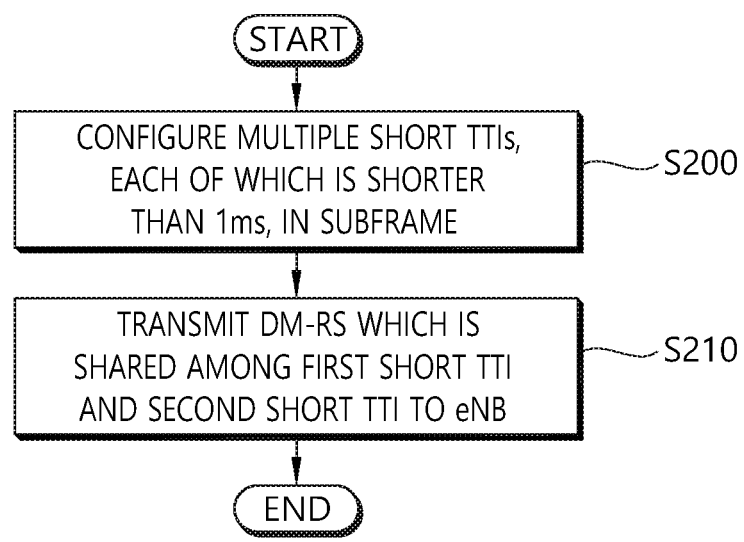
FIG. 12 shows a method for transmitting DM-RS according to another embodiment of the present invention.

FIG. 12 shows a method for transmitting DM-RS according to another embodiment of the present invention. The present invention described above, i.e. sharing the DM-RS among different short TTIs, may be applied to this embodiment.

In step S200, the UE configures multiple short transmission time intervals (TTIs), each of which is shorter than 1 ms, in a subframe. In step S210, the UE transmits the DM-RS which is shared among a first short TTI and a second short TTI to the eNB.

A position or OFDM symbols carrying the DM-RS may be shared among the first short TTI and the second short TTI. The first short TTI and the second short TTI may consist of a scheduling unit of a sPDSCH for the UE. In this case, the DM-RS may be transmitted only in the first short TTI. And, a number of short TTIs consisting of the scheduling unit of the sPDSCH may be indicated by the eNB via higher layer signaling. Further, a starting subframe and an ending subframe in which the DM-RS is shared is indicated by the eNB via higher layer signaling.

The present invention described above has been described for DL transmission. However, the similar concept/idea described above may be applied to UL transmission as well. In this case, DM-RS may be transmitted by a UE in a different short TTI from PUSCH transmission or PUCCH transmission.

Figure 13:
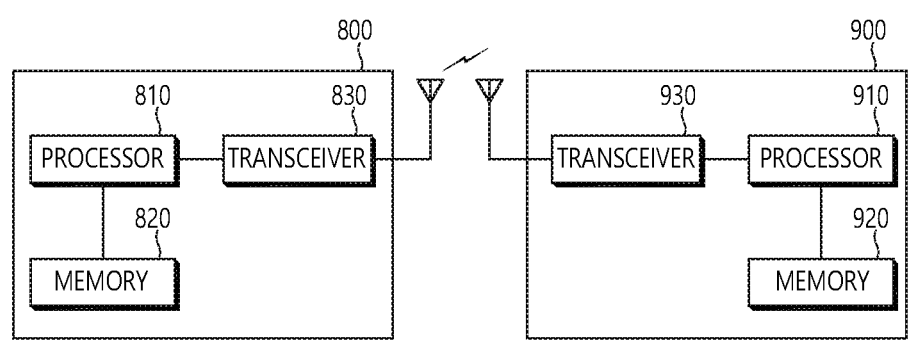
FIG. 13 shows a wireless communication system to implement an embodiment of the present invention.

FIG. 13 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting a demodulation reference signal (DM-RS) by a first user equipment (UE) in a wireless communication system, the method comprising:

configuring multiple short transmission time intervals (TTIs), each of which is shorter than 1 ms, in a subframe; and transmitting the DM-RS which is shared among the first UE and a second UE in one or more of the multiple short TTIs to an eNodeB (eNB), wherein the DM-RS shared among the first UE and the second UE uses different DM-RS sequences for the first UE and the second UE, respectively, and wherein the different DM-RS sequences are differentiated by a code.

2. The method of claim 1, wherein the DM-RS is transmitted in a reference TTI, which is one short TTI among the multiple short TTIs.

3. The method of claim 2, wherein the reference TTI is indicated by downlink control information (DCI) received from the eNB.

4. The method of claim 2, wherein the reference TTI is located earlier or later than a short TTI in which data or control signaling is transmitted, or the reference TTI is the same short TTI in which data control signaling is transmitted.

5. The method of claim 2, wherein the DM-RS is transmitted by using a physical resource block (PRB) in which data is transmitted in the reference TTI or entire PRBs in the reference TTI.

6. The method of claim 2, wherein the DM-RS is transmitted by using a set of PRBs in the reference TTI.

7. The method of claim 6, wherein the set of PRBs in the reference TTI is configured by the eNB via higher layer signaling.

8. A first user equipment (UE) in a wireless communication system, comprising:

a memory;

a transceiver; and at least one processor operatively coupled to the memory and the transceiver, wherein the at least one processor is configured to:

configure multiple short transmission time intervals (TTIs), each of which is shorter than 1 ms, in a subframe; and control the transceiver to transmit the DM-RS which is shared among the first UE and a second UE in one or more of the multiple short TTIs to an eNodeB (eNB), wherein the DM-RS shared among the first UE and the second UE uses different DM-RS sequences for the first UE and the second UE, respectively, and wherein the different DM-RS sequences are differentiated by a code.

9. The first UE of claim 8, wherein the DM-RS is transmitted in a reference TTI, which is one short TTI among the multiple short TTIs.

10. The first UE of claim 9, wherein the reference TTI is indicated by downlink control information (DCI) received from the eNB.

11. The first UE of claim 9, wherein the reference TTI is located earlier or later than a short TTI in which data or control signaling is transmitted, or the reference TTI is the same short TTI in which data control signaling is transmitted.

12. The first UE of claim 9, wherein the DM-RS is transmitted by using a physical resource block (PRB) in which data is transmitted in the reference TTI or entire PRBs in the reference TTI.

13. The first UE of claim 9, wherein the DM-RS is transmitted by using a set of PRBs in the reference TTI.

14. The first UE of claim 13, wherein the set of PRBs in the reference TTI is configured by the eNB via higher layer signaling.

\* \* \* \* \*